United States Patent
Kim et al.

(10) Patent No.: US 9,977,576 B2
(45) Date of Patent: May 22, 2018

(54) METHOD AND APPARATUS FOR MANAGING AN APPLICATION BEING EXECUTED IN A PORTABLE TERMINAL

(71) Applicant: Samsung Electronics Co. Ltd., Suwon-si, Gyeonggi-do (KR)

(72) Inventors: Bo-Sung Kim, Suwon-si (KR); Jong-Kyun Shin, Seongnam-si (KR); Hee-Deog Kim, Seongnam-si (KR); Hyung-Chul Jung, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 572 days.

(21) Appl. No.: 14/558,676

(22) Filed: Dec. 2, 2014

(65) Prior Publication Data

US 2015/0153937 A1    Jun. 4, 2015

Related U.S. Application Data

(63) Continuation of application No. 13/115,881, filed on May 25, 2011, now Pat. No. 8,904,401.

(30) Foreign Application Priority Data

May 25, 2010 (KR) .................. 10-2010-0048811
Mar. 11, 2011 (KR) .................. 10-2011-0029664

(51) Int. Cl.
*G06F 3/0484* (2013.01)
*G06F 11/32* (2006.01)
(Continued)

(52) U.S. Cl.
CPC ...... *G06F 3/04842* (2013.01); *G06F 3/04817* (2013.01); *G06F 11/328* (2013.01); *G06F 11/3409* (2013.01); *Y02B 60/165* (2013.01)

(58) Field of Classification Search
None
See application file for complete search history.

(56) References Cited

U.S. PATENT DOCUMENTS 5,724,426 A    3/1998    Rosenow et al.
6,918,006 B1    7/2005    Archibald, Jr. et al.
(Continued)

FOREIGN PATENT DOCUMENTS

CN    1143436 A    2/1997
CN    1937822 A    3/2007
(Continued)

OTHER PUBLICATIONS

James E. Lee, Windows Tip: Put Task Manager in Widget Mode, http://jameselee.alwaysaskwhy.com/blog/2006/10/windows_tip-_put_task_manager_in_widget_mode.html, Oct. 20, 2006.
(Continued)

*Primary Examiner* — Kenneth Tang
(74) *Attorney, Agent, or Firm* — Jefferson IP Law, LLP

(57) ABSTRACT

A method and an apparatus are provided for preventing battery power consumption and degradation of system performance due to the system resources being utilized by applications being executed, while providing a multi-tasking function through a plurality of applications. In the method, when a plurality of applications are executed, such execution of the plurality of applications is reported to the user, so as to enable the user to terminate one or more applications, thereby preventing unnecessary consumption of battery power.

19 Claims, 10 Drawing Sheets

(51) Int. Cl.
  *G06F 11/34* (2006.01)
  *G06F 3/0481* (2013.01)

(56) References Cited

U.S. PATENT DOCUMENTS

| | | | |
|---|---|---|---|
| 6,988,248 B1 | 1/2006 | Tang et al. | |
| 7,185,211 B2 | 2/2007 | Loughran | |
| 7,440,751 B2 | 10/2008 | Boros | |
| 7,996,045 B1 | 8/2011 | Bauer et al. | |
| 8,510,743 B2 | 8/2013 | Hackborn et al. | |
| 2005/0060663 A1 | 3/2005 | Arkeketa et al. | |
| 2005/0177832 A1* | 8/2005 | Chew | G06F 9/44594 718/104 |
| 2005/0240756 A1 | 10/2005 | Mayer | |
| 2006/0136882 A1 | 6/2006 | Noonan et al. | |
| 2008/0268828 A1 | 10/2008 | Nagaraja | |
| 2009/0037920 A1* | 2/2009 | Brown | G06F 9/4443 718/104 |
| 2009/0094473 A1 | 4/2009 | Mizutani | |
| 2009/0249247 A1 | 10/2009 | Tseng et al. | |
| 2009/0293062 A1* | 11/2009 | Amir | G06F 9/485 718/104 |
| 2009/0307205 A1 | 12/2009 | Churchill et al. | |
| 2010/0295789 A1 | 11/2010 | Shin et al. | |
| 2011/0252370 A1* | 10/2011 | Chaudhri | G06F 3/04883 715/830 |
| 2011/0283291 A1* | 11/2011 | Tobe | G06F 9/461 718/104 |
| 2012/0117507 A1 | 5/2012 | Tseng et al. | |
| 2012/0140255 A1* | 6/2012 | Tanaka | G06F 9/445 358/1.13 |
| 2012/0210325 A1 | 8/2012 | De Lind Van Wijngaarden et al. | |
| 2013/0024818 A1 | 1/2013 | Rainisto et al. | |

FOREIGN PATENT DOCUMENTS

| | | |
|---|---|---|
| CN | 101120318 A | 2/2008 |
| CN | 101655808 A | 2/2010 |
| CN | 101706724 A | 5/2010 |
| EP | 1 739 524 A2 | 1/2007 |
| KR | 10-0631661 B1 | 9/2006 |
| KR | 10-2007-0087133 A | 8/2007 |
| WO | 02/079957 A2 | 10/2002 |
| WO | 2006/064353 A2 | 6/2006 |

OTHER PUBLICATIONS

Androidguys, Task Managers: The Nearly Ultimate Comparison Review, http://www.androidguys.com/2009/12/21/task-managers-the-nearly-ultimate-comparison-review/, Dec. 21, 2009.
Elcondor, MMTaskManager v1.6: A Simple Task Manager, http://www.xda-developers.com/windows-mobile/mmtaskmanager-v1-6-a-simple-task-manager/, Apr. 9, 2010.
Jayce, MMTaskManager v1.6 ~ A Simple Task Manager for Windows Mobile, http://web.archive.org/web/20100414095250/http://www.jayceooi.com/2010/04/11/mmtaskmanager-v1-6-a-simple-task-manager-for-windows-mobile, Apr. 14, 2010.
Werner Willemsens, Task Manager for Windows Mobile and Windows CE, http://www.codeproject.com/articles/30871/Task-Manager-for-Windows-Mobile-and-Windows-CE, Nov. 30, 2008.
Chris Seibold, Quit All Applications Workflow, Big Book of Apple Hacks, Apr. 17, 2008, O'Reilly Media, Inc., p. 90.
Bott et al., Managing Running Programs and Processes with Windows Task Manager, Windows Vista Inside Out, Jan. 17, 2007, Microsoft Press, p. 130.
Russel et al., Using Resource View, Windows Small Business Server 2008 Administrator's Companion, Jan. 7, 2009, Microsoft Press, p. 629.
Mark Friedman: "Microsoft Windows Server 2003 Performance Guide"; pp. 1-10; Jun. 8, 2005.

\* cited by examiner

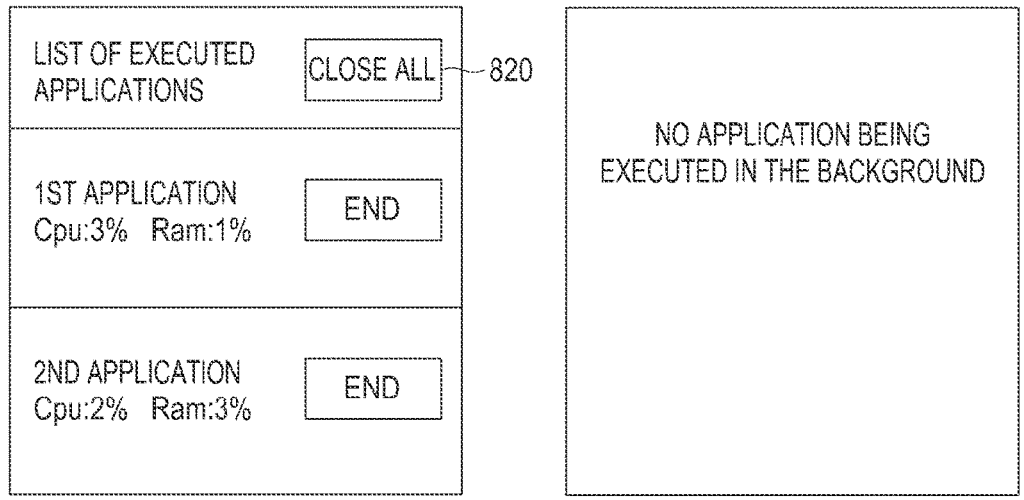
FIG.9A
FIG.9B
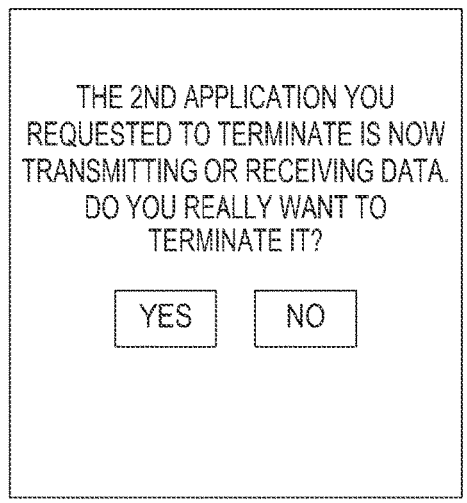
FIG.9C

| PROGRAMS BEING EXECUTED | INSTALLED PROGRAMS | TOTAL | ADVICE |
|---|---|---|---|

2:16 PM

DO YOU WANT TO USE THE BATTERY LONGER?

THE LIFE OF A BATTERY RELATES TO THE AMOUNT THE CPU IS USED. BY CLOSING UNNECESSARY PROGRAMS, YOU CAN REDUCE THE AMOUNT THE CPU IS USED AND YOU CAN USE THE BATTERY LONGER.

1. AN APPLICATION CONTINUOUSLY OPERATING IN THE BACKGROUND MAY BE A CAUSE OF BATTERY CONSUMPTION. IT IS RECOMMENDED TO USE A 'BACK' KEY RATHER THAN A 'HOME' KEY IN ORDER TO CLOSE AN APPLICATION (PRESSING A 'BACK' KEY MAY CLOSE MOST OF APPLICATIONS, WHILE PRESSING A 'HOME' KEY MAY KEEP THEM RUNNING IN THE BACKGROUND).
2. USE OF THE "PROGRAM MONITOR" WIDGET ENABLES AN EASY CONFIRMATION OF THE NUMBER OF PROGRAMS BEING CURRENTLY RUN (SPECIFIC PROGRAMS ARE INVISIBLE).
3. BE CAUTIOUS ABOUT INSTALLING APPLICATIONS, WHICH DOES DO NOT HAVE A CLEARLY KNOWN ORIGIN OR MAY THREATEN SECURITY (THEY MAY CAUSE LARGE DRAIN).
4. USE THE DATA COMMUNICATION BASICALLY IN THE BACKGROUND WHEN SETTING UP A GOOGLE ACCOUNT WHEN SETTING UP A GOOGLE ACCOUNT, IT IS BASICALLY SET TO USE DATA COMMUNICATION IN THE BACKGROUND. IN ORDER TO EXTEND THE BATTERY LIFE, CANCEL THE "AUTO-SYNC" FUNCTION IN "ENVIRONMENT SETUP -> ACCOUNT AND SYNC" AND THEN SYNCHRONIZE MANUALLY.
5. IF WI-FI AND BLUETOOTH ARE ALWAYS TURNED ON, IT MAY CONSUME THE BATTERY.
6. WHEN THE BATTERY HAS BEEN EXCESSIVELY CONSUMED OR ABNORMALLY OPERATES, PRESS THE RESET BUTTON OR END THE POWER AND THEN RESTART THE POWER.

FIG.10

METHOD AND APPARATUS FOR MANAGING AN APPLICATION BEING EXECUTED IN A PORTABLE TERMINAL

CROSS-REFERENCE TO RELATED APPLICATION(S)

This application is a continuation application of U.S. patent application Ser. No. 13/115,881 filed May 25, 2011 in the U.S. Patent and Trademark Office, which issued as U.S. Pat. No. 8,904,401 on Dec. 2, 2014, and which claims the benefit under 35 U.S.C. § 119(a) of a Korean patent application filed in the Korean Intellectual Property Office on May 25, 2010 and assigned Ser. No. 10-2010-0048811, and a Korean patent application filed in the Korean Intellectual Property Office on Mar. 31, 2011 and assigned Ser. No. 10-2011-0029664, the entire disclosure of each of which is hereby incorporated by reference.

BACKGROUND OF THE INVENTION

1. Field of the Invention

The present invention relates to a portable terminal. More particularly, the present invention relates to a method and an apparatus for managing an application being executed in a portable terminal.

2. Description of the Related Art

With the development of portable terminals towards devices capable of using various types of information beyond the voice communication function, portable terminals are now evolving into smart phones capable of providing various functions through various applications.

Therefore, recent portable terminals have a multi-tasking function, by which a user can execute and use an application while another application is being executed.

According to the multi-tasking function, the application being executed is first switched into a background execution state and a new application is then foreground-executed, so that a user can use functions provided by the foreground-executed application. As a result, the user can simultaneously perform various jobs through various functions provided by the applications, while switching between the application being executed in the background and the application being executed in the foreground.

Such a multi-tasking, in which multiple applications simultaneously provide various functions while being executed in the background or foreground, can provide various advantages for users. However, the multi-tasking accelerates the battery power consumption of the portable terminal.

In other words, even though the application being executed in the foreground is switched into the background, the application switched into the background still utilizes a certain amount of system resources of the portable terminal, such as Central Processing Unit (CPU) resources and memory resources, and thereby continues consuming the battery power of the portable terminal.

The larger the number of applications being executed in the background, the more the battery power is being consumed. Therefore, the larger the number of applications being executed in the background is, the shorter the operation time (e.g., call standby time or continuous communication time) of the portable terminal becomes.

Further, the system resources utilized by the applications being executed in the background may degrade the system performance closely relating to the capability of the portable terminal.

Therefore, there has been a request for a new technology capable of preventing unnecessary power consumption of a portable terminal and improving the system performance thereof while increasing the convenience of the user by allowing a simultaneous execution of multiple applications through the multi-tasking.

SUMMARY OF THE INVENTION

Aspects of the present invention are to address at least the above-mentioned problems and/or disadvantages and to provide at least the advantages described below. Accordingly, an aspect of the present invention is to propose a solution, which can minimize the battery power consumption of a portable terminal and improve the system performance thereof while providing a multi-tasking function allowing a user to execute and use multiple applications.

In accordance with an aspect of the present invention, a method of managing an application being executed in a portable terminal is provided. The method includes executing an application in response to a request for execution of the application, and displaying information on one or more applications being executed.

In accordance with another aspect of the present invention, a method of managing an application being executed in a portable terminal is provided. The method includes identifying system resources utilized by one or more applications being executed in a background, and displaying information corresponding to the utilized system resources through an indicator bar.

In accordance with another aspect of the present invention, a method of managing an application being executed in a portable terminal is provided. The method includes determining whether a condition for displaying one or more applications being executed is satisfied, and when the condition is satisfied, displaying information on the one or more applications being executed.

In accordance with another aspect of the present invention, an apparatus for managing an application being executed in a portable terminal is provided. The apparatus includes a controller for executing an application in response to a request for execution of the application, and for controlling to display information on one or more applications being executed on a display unit.

In accordance with another aspect of the present invention, an apparatus for managing an application being executed in a portable terminal is provided. The apparatus includes a controller for identifying system resources utilized by one or more applications being executed in a background and for controlling to display information corresponding to the utilized system resources through an indicator bar.

In accordance with another aspect of the present invention, an apparatus for managing an application being executed in a portable terminal is provided. The apparatus includes a controller for determining whether a condition for displaying one or more applications being executed is satisfied, and for controlling to display information on the one or more applications being executed on a display unit when the condition is satisfied.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which:

FIGS. 9A to 9C illustrate second examples of screens according to the third exemplary embodiment of the present invention; and FIG. 10 illustrates a third example of a screen according to the third exemplary embodiment of the present invention.

Throughout the drawings, it should be noted that like reference numbers are used to depict the same or similar elements, features, and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
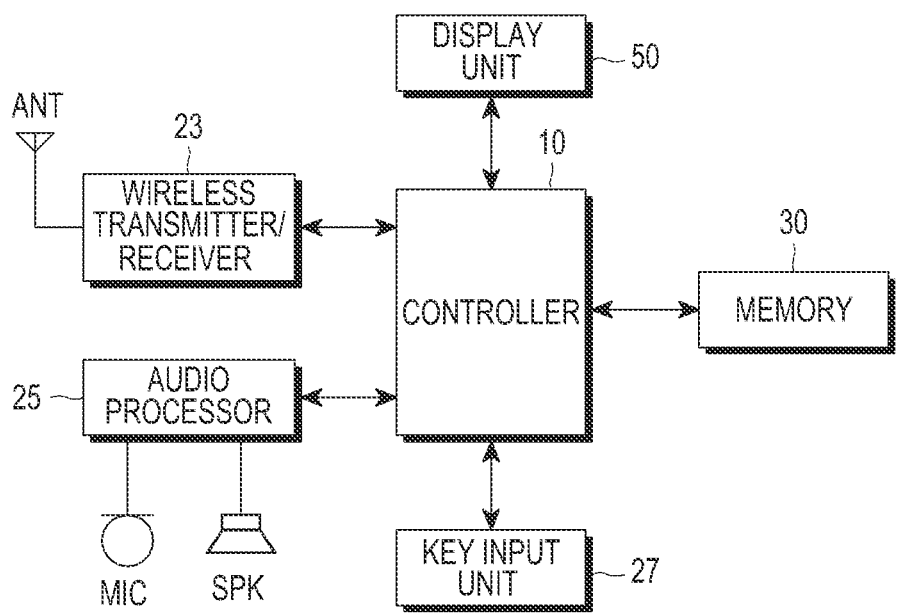
FIG. 1 is a block diagram of a portable terminal according to an exemplary embodiment of the present invention.

FIG. 1 is a block diagram of a portable terminal according to an exemplary embodiment of the present invention. Although some devices, such as a Global Positioning System (GPS) module, a camera module, a Bluetooth module, a WiFi module, an acceleration sensor, an approach sensor, an earth magnetic field sensor, and a Digital Media Broadcasting (DMB) receiver, which can be included in a typical portable terminal, are not illustrated in FIG. 1, it goes without saying that the devices not illustrated in FIG. 1 can also be included in a portable terminal according to an exemplary embodiment of the present invention and can provide corresponding functions.

A portable terminal according to an exemplary embodiment of the present invention corresponds to a mobile electronic device, such as one of a video phone, a mobile phone, a smart phone, an International Mobile Telecommunication 2000 (IMT-2000) terminal, a Wideband Code Division Multiple Access (WCDMA) terminal, a Universal Mobile Telecommunication Service (UMTS) terminal, a Personal Digital Assistant (PDA), a Portable Multimedia Player (PMP), a Digital Multimedia Broadcasting (DMB) terminal, a personal computer, a desktop computer, a notebook computer, etc.

Referring to FIG. 1, a wireless transmitter/receiver 23 includes a Radio Frequency (RF) unit and a modem. The RF unit includes an RF transmitter for up-converting and amplifying the frequency of a transmitted signal, and an RF receiver for low noise-amplifying a received signal and down-converting the frequency of the received signal. The modem includes a transmitter for encoding and modulating a signal to be transmitted and a receiver for decoding and demodulating the signal received through the RF unit.

The audio processor 25 may have a codec, which includes a data codec and an audio codec. The data codec processes packet data, etc. and the audio codec processes an audio signal including voice and multimedia files, etc. The audio processor 25 converts a digital audio signal received through the modem to an analog signal and reproduces the converted analog signal, or converts an analog signal generated by a microphone into a digital audio signal through the audio codec and transmits the converted digital audio signal to the modem. The codec may be either separately arranged or included in the controller 10.

The key input unit 27 includes keys used for the input of numbers and character information and function keys used for the setting of various functions. When the display unit 50 according to an exemplary embodiment of the present invention is implemented with a touch-screen, the key input unit 27 may be excluded from the construction of a portable terminal according to an exemplary embodiment of the present invention or may include only preset minimum keys.

The memory 30 may include a program memory and a data memory. The program memory stores programs for controlling general operations of the portable terminal. The memory 30 may be Random-Access Memory (RAM), Read-Only Memory (ROM), or a combination thereof. The memory 30 may be an external memory, such as Compact Flash (CF), Secure Digital (SD), Micro-SD, Mini-SD, Extreme Digital (xD), or Memory Stick. The memory 30 according to an exemplary embodiment of the present invention stores applications providing various functions implemented by the portable terminal, and the applications may be previously provided at the time of release of the portable terminal into the market or downloaded by users.

The display unit 50 may include a Liquid Crystal Display (LCD) or an Organic Light Emitting Diode (OLED), such as a Passive Matrix OLED (PMOLED) or an Active Matrix OLED (AMOLED), and outputs various display information provided by the portable terminal. The display unit 50 according to an exemplary embodiment of the present invention may have a touch screen and thus operate as an input unit together with the key input unit 27, in order to control the portable terminal.

The controller 10 controls general operations of the portable terminal according to an exemplary embodiment of the present invention, and may switch and control the operation of the portable terminal according to an input of the user through the key input unit 27 or the display unit 50. The controller 10 may be a Central Processing Unit (CPU). The operation of the controller 10 will be discussed in more detail through the exemplary embodiments of the present invention described below.

First Exemplary Embodiment

Figure 2:
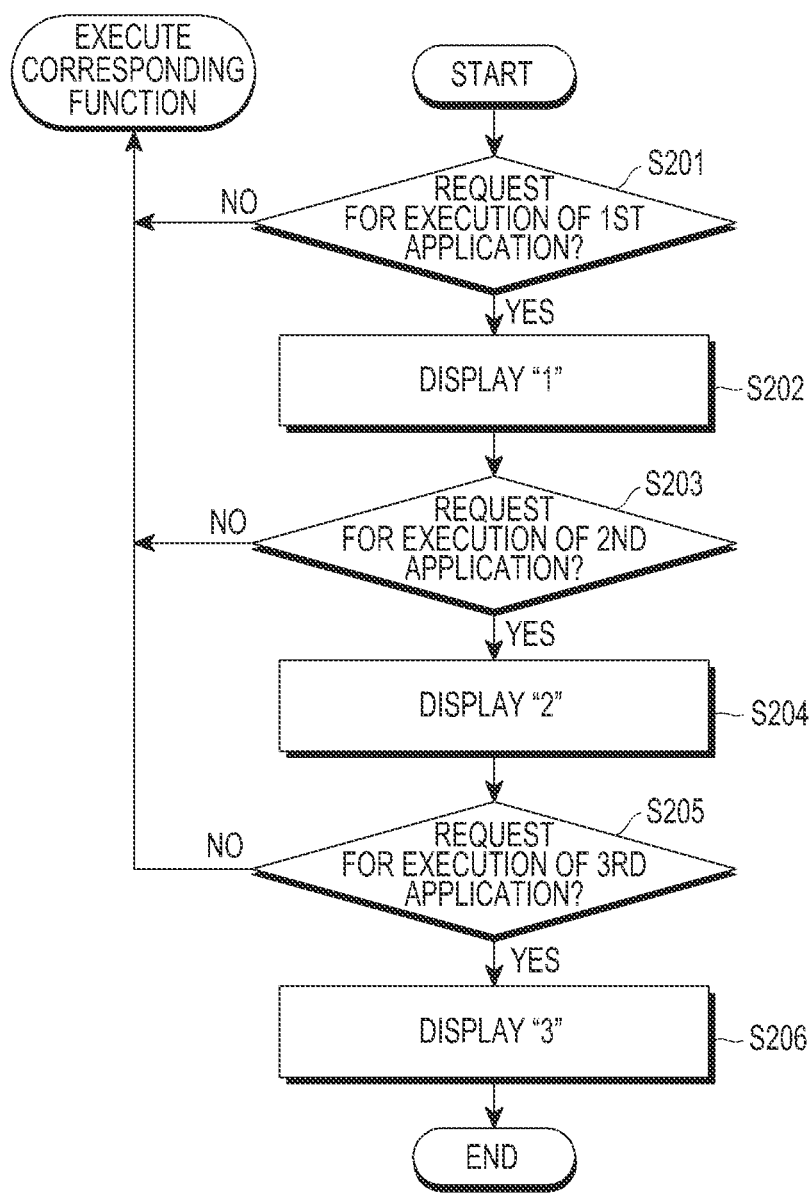
FIG. 2 is a flowchart illustrating a process of displaying the number of executed applications according to a first exemplary embodiment of the present invention.

The first exemplary embodiment of the present invention corresponds to a process of identifying the number of executed applications and then reporting the identified number to a user. FIG. 2 is a flowchart illustrating a process of displaying the number of executed applications according to a first exemplary embodiment of the present invention, and FIGS. 3A to 4D illustrate examples of screens displayed according to the first exemplary embodiment of the present invention.

The following description of the first exemplary embodiment of the present invention with reference to FIGS. 2 to 4D is based on an assumption that a first application, a second application, and a third application have been sequentially executed.

In steps S201 to S202, when there is a request for execution of the first application from a user, the controller 10 executes the first application and then enters into a standby mode while controlling to display the number "1" through a preset application in order to notify that only one application (i.e., the first application) is being executed.

Figure 3A:
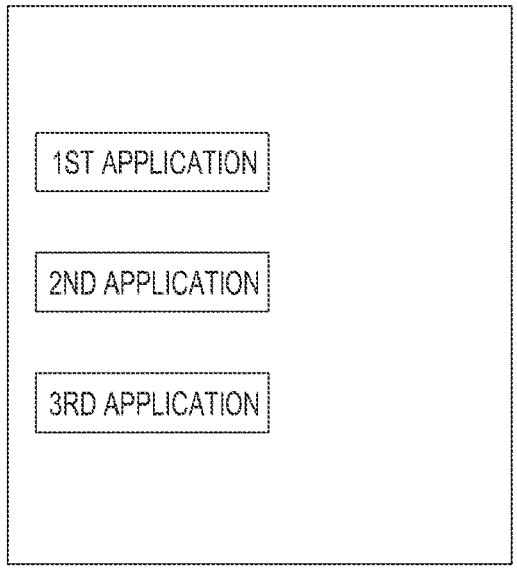
FIGS. 3A to 3D illustrate examples of screens displayed according to the first exemplary embodiment of the present invention.
Figure 3B:
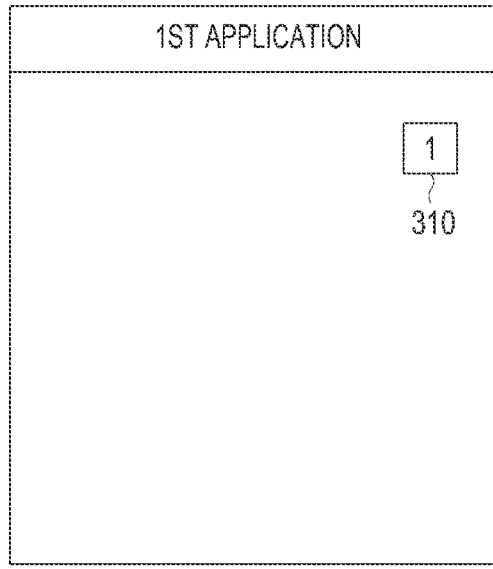

Referring to FIGS. 3A to 3D showing step S202, the user can request the execution of the first application by selecting (e.g., touching) the first application in the standby screen (or home screen) shown in FIG. 3A, and the controller 10 executes the first application as shown in FIG. 3B.

Then, in order to notify that one application (i.e., the first application) has been executed (or is being executed), the controller 10 may control to display the number "1" (this number can be made to disappear after being displayed for a preset time) on the screen on which the first application is being executed, as indicated by numeral 310 in FIG. 3B.

Figure 3C:
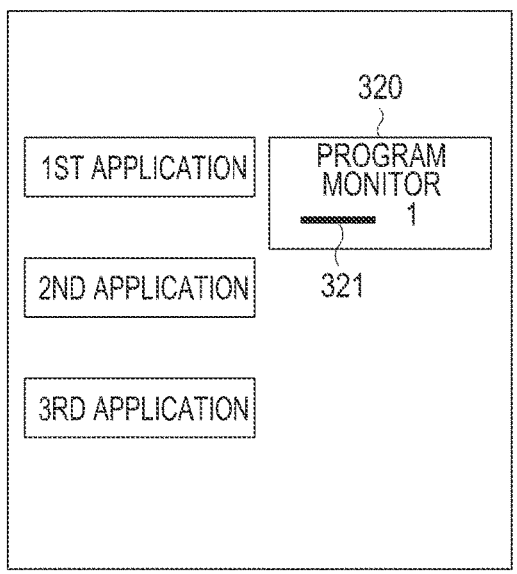

Otherwise, according to a modified exemplary embodiment of the present invention, if the user requests an entry into a standby screen by inputting a preset key (e.g., a home screen key), the number "1" may be displayed through a preset widget (or application), such as the "program monitor" 320 shown in FIG. 3C, so as to notify the number of executed applications.

In steps S203 to S204, when there is a request for the execution of the second application, the controller 10 executes the second application and simultaneously controls to display the number "2" so as to notify that two applications (including the first application and the second application) are being executed.

Figure 3D:
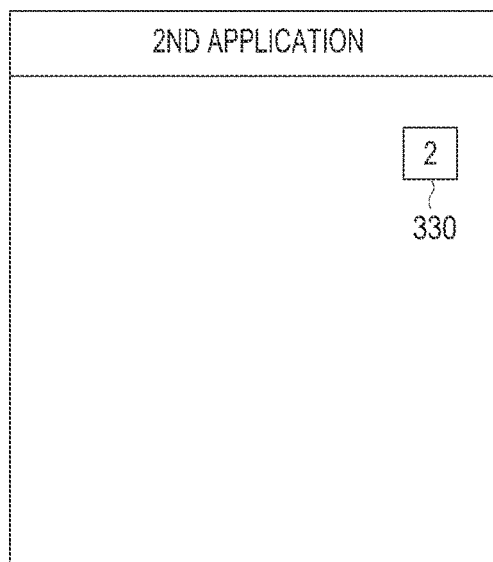

Referring to FIGS. 3A to 4D, in steps S203 to S204, the user can request the execution of the second application by selecting the second application through an entry into the standby screen even while the first application is being executed, and the controller 10 first switches the first application being executed into a background execution state and then executes the second application in a foreground state as shown in FIG. 3D.

Then, in order to notify that two applications including the first application (being executed in the background) and the second application (being currently executed, that is, being executed in the foreground) are being executed, the controller 10 may control to display the number "2" (this number can be made to disappear after being displayed for a preset time) on the screen on which the second application is being executed, as indicated by numeral 330 in FIG. 3D.

Figure 4A:
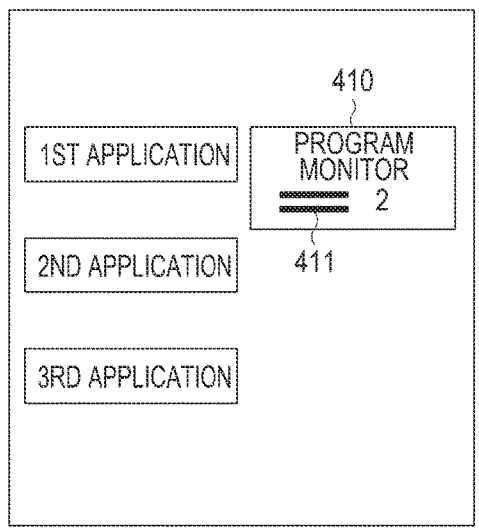
FIGS. 4A to 4D illustrate other examples of screens displayed according to the first exemplary embodiment of the present invention.

At this time, as in the modified exemplary embodiment described above, when there is a request for entry into the standby screen, the controller 10 may control to display the number "2" through a preset widget, such as the program monitor 410 shown in FIG. 4A, so as to notify the user that the number of executed applications is two.

In steps S205 to S206, when there is a request for the execution of the third application, the controller 10 executes the third application and simultaneously controls to display the number "3", so as to notify that three applications (including the first application, the second application, and the third application) are being executed.

Figure 4B:
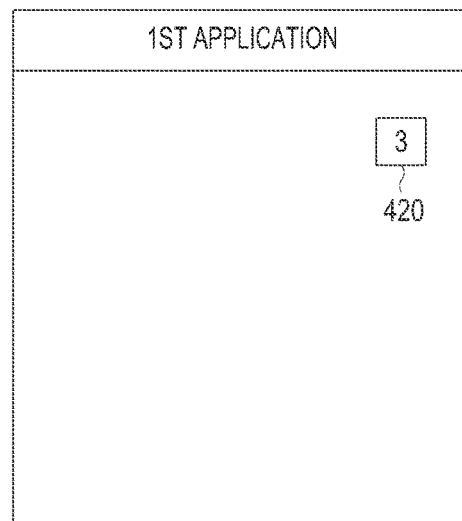

Referring to FIGS. 4A to 4D showing steps S205 to S206, the user can request the execution of the third application through an entry into the standby screen even while the first application (being executed in the background) and the second application (being currently executed, that is, being executed in the foreground) are being executed, and the controller 10 first switches the second application being executed, like the first application, into the background execution state and then executes the third application in the foreground state as shown in FIG. 4B.

Figure 4C:
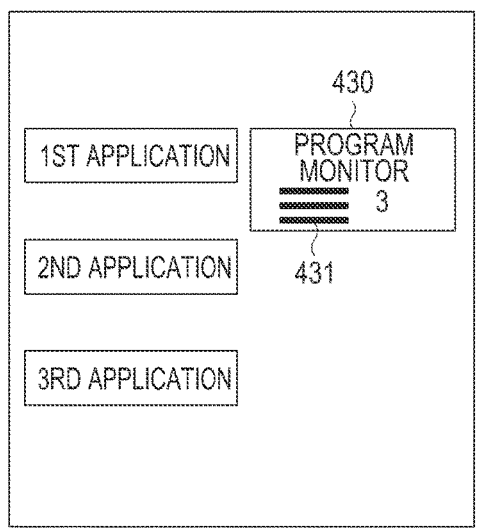

Thereafter, similarly to steps S201 to S204 described above, in order to notify that three applications including the first application (being executed in the background), the second application (being executed in the background), and the third application (being currently executed in the foreground) are being executed, the controller 10 may control to display the number "3" on the screen, on which the third application is being executed, or control to display the number "3" through a preset widget, as indicated by numeral 420 in FIG. 4B or as shown in FIG. 4C. At this time, if the screen of the portable terminal enters into a standby mode as shown in FIG. 4C, the third application is also executed in the background.

By the process including steps S201 to S206 according to the first exemplary embodiment described above, the user can identify the number of applications being executed (in the background and foreground).

At this time, according to a modification of the first exemplary embodiment, it is possible to display an icon or icons of the application or applications being executed, instead of displaying the number of applications being executed.

For example, instead of displaying the number "3" through a widget 430 named "program monitor" as shown in FIG. 4C, it is possible to display icons corresponding to the first application, the second application, and the third application in the widget 430 (specifically, reduced-sized icons may be displayed in the widget).

Further, according to another modification of the first exemplary embodiment, it is possible to display the number of applications being executed in the background together with the same number of gauges as the number of applications, as indicated by reference numeral 321 of FIG. 3C, reference numeral 411 of FIG. 4A, and reference numeral 431 of FIG. 4C, so as to enable the user to easily identify the number of applications being executed in the background.

Moreover, according to an additional modification of the first exemplary embodiment, a scheme of providing visual effects to icons displayed on a standby screen (for example, a home screen) is provided, so as to enable a user to more easily identify the number of applications being executed in the background.

Figure 4D:
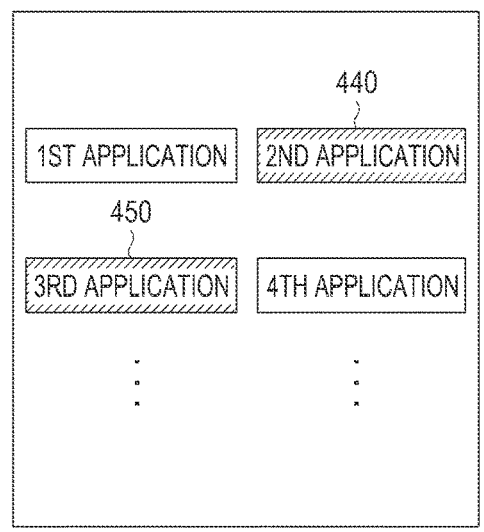

When it is identified that the second application and the third application are being executed in the background, the controller 10 according to an exemplary embodiment of the present invention can give a visual effect to the icons 440 and 450 corresponding to the applications (for example, the controller 10 may change the colors or shapes of the icons) in the standby screen as shown in FIG. 4D, so as to enable a user to easily identify that the second application and the third application are being executed in the background.

Further, according to a modified exemplary embodiment of the present invention, it is possible to change the size of an icon or to provide an animation effect to the icon, according to the amount of system resources utilized by an application corresponding to the icon, which is being executed in the background.

As described above, through a single identification of icons displayed on a standby screen, the user can identify the applications executed in the background and can easily identify the quantity of utilized system resources.

Meanwhile, in the first exemplary embodiment of the present invention, the user is notified of the number of executed applications through a visual effect (e.g., visual information provided through a number, widget, or application). However, in various modified exemplary embodiments of the present invention, the user may be notified of the number of executed applications through various other effects, including auditory effect and tactile effect, which can be recognized by the user.

For example, when the number of executed applications is two, the portable terminal may be vibrated twice or may output sound information (e.g., two beep sounds) corresponding to the number "2", so that the user can identify that the number of executed applications is two.

Second Exemplary Embodiment

Figure 5:
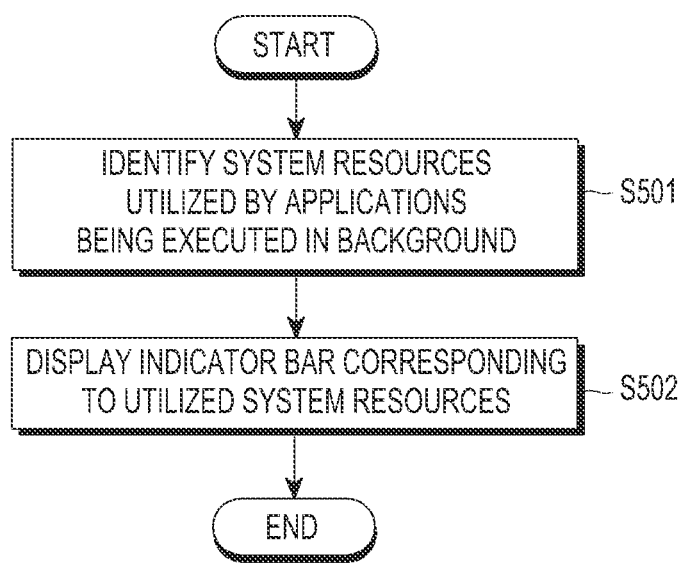
FIG. 5 is a flowchart illustrating a process of notifying a user of a status of utilized system resources according to a second exemplary embodiment of the present invention.

The second exemplary embodiment of the present invention corresponds to a process of notifying a user of a status of the system resources, which are utilized by one or more applications being executed in the background, through an indicator bar. FIG. 5 is a flowchart illustrating a process of notifying a user of a status of utilized system resources according to a second exemplary embodiment of the present invention, and FIGS. 6A to 6D illustrate examples of screens displayed according to the second exemplary embodiment of the present invention.

Hereinafter, the second exemplary embodiment of the present invention will be described with reference to FIGS. 5 to 6D.

In the following description of the second exemplary embodiment, the utilization of the system resources may refer to either one or both of the use ratio (or utilization ratio) of a CPU (or the controller 10 as a CPU) or the use ratio (or utilization ratio) of the memory 30. More specifically, in exemplary embodiments of the present invention, the utilization of the system resources may be considered as, for example, 2% or 3% corresponding to the CPU utilization ratio (e.g., 2%) or the memory utilization ratio (e.g., 3%), respectively, or may be considered as 5%, which corresponds to the sum of two utilization ratios.

Further, the indicator bar corresponds to an area for displaying additional information related to the use of a portable terminal on a particular location of a display screen (e.g., at a top or bottom of the display screen). The indicator bar may either disappear when a preset application is executed or continue to be displayed even during execution of one or more applications. The indicator bar display may one or more of time information (e.g., current time), intensity of a received signal, remaining power of the battery, vibration setting status (e.g., vibration on/off), information on wireless communication connection state (e.g., connection state of WiFi or Bluetooth), etc.

In steps S501 to S502, the controller 10 identifies the system resources utilized by one or more applications being executed in the background, and controls the displaying of the indicator bar so that the displaying of the indicator bar corresponds to the utilized system resources.

The one or more applications being executed in the background utilize the system resources, which consume the power of the portable terminal. Therefore, in order to prevent power consumption by an application which is not being executed in the foreground (that is, an application being executed in the background), the controller 10 according to an exemplary embodiment of the present invention may notify the user of the utilization ratio, which indicates a proportion of the system resources utilized by one or more applications being executed in the background with respect to the entire system resource, through a visual discrimination (e.g., discrimination by colors) between the utilization ratios.

That is, the controller 10 may arrange levels for classifying the sum of the system resources utilized by one or more applications being executed in the background and control to display the indicator bar with classified colors according to the levels, so as to notify the user of the utilization ratio.

Figure 6A:
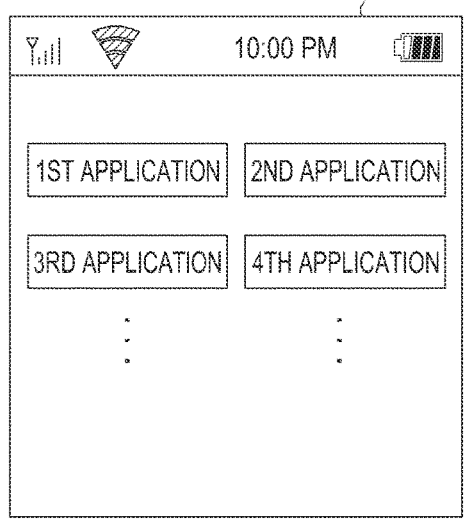
FIGS. 6A to 6D illustrate examples of screens displayed according to the second exemplary embodiment of the present invention.

For example, when the sum of the system resources utilized by the one or more applications being executed in the background corresponds to less than 5% of the entire system resources, the controller 10 may control to display the indicator bar without any additional color as the indicator bar 600 shown in FIG. 6A. When the sum of the system resources utilized by the one or more applications being executed in the background corresponds to between 5% and 10% of the entire system resources, the controller 10 may control to display the indicator bar in a green color as the indicator bar 610 shown in FIG. 6B. When the sum of the utilized system resources corresponds to between 10% and 20% of the entire system resources, the controller 10 may control to display the indicator bar in yellow color as the indicator bar 620 shown in FIG. 6C. Further, when the sum of the utilized system resources corresponds to more than 20% of the entire system resources, the controller 10 may control to display the indicator bar in red color as the indicator bar 630 shown in FIG. 6D. As a result, if the indicator bar is being displayed in red color, the user can identify that the one or more applications being executed in the background are consuming too much power, and may terminate any number of the one or more applications being executed in the background. Here, the user can set the levels of the system resources utilization and the colors corresponding to the ranges according to the levels, and may set other visual effects in addition to the colors.

According to a modification of the second exemplary embodiment of the present invention, simultaneously while displaying the indicator bar with a discriminated color corresponding to the sum of the system resources utilized by the one or more applications being executed in the background, it is possible to display the sum of the system resources corresponding to the discriminated color in the indicator bar.

Figure 6B:
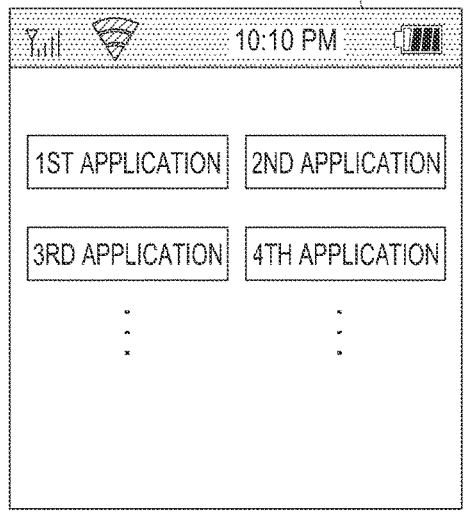
Figure 6C:
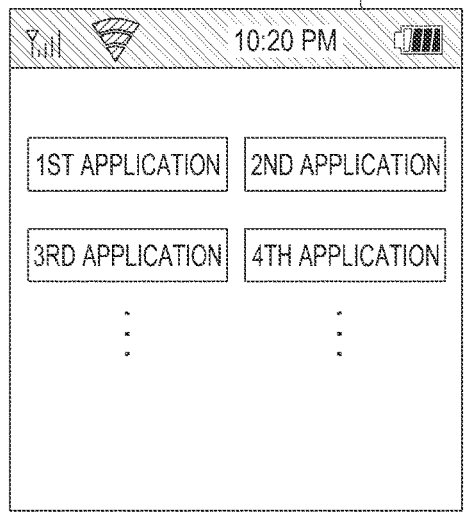
Figure 6D:
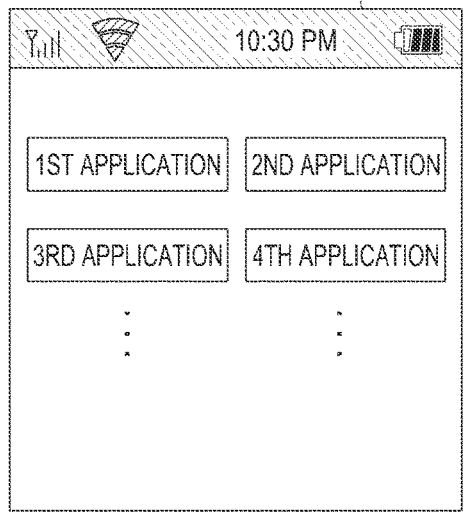

For example, simultaneously while the indicator bar 610 is displayed in the green color as shown in FIG. 6B, a numerical value reading "5%" (or information reading "utilized system resource 5%") may be displayed on a preset portion within the indicator bar 610, so as to notify the user that the applications being executed in the background are utilizing 5% of the entire system resources of the portable terminal. Therefore, a numerical value reading "10%" (or information reading "utilized system resource 10%") may be displayed together with a corresponding color on a preset portion within the indicator bar 620 shown in FIG. 6C, and a numerical value reading "20%" (or information reading "utilized system resource 20%") may be displayed together with a corresponding color on a preset portion within the indicator bar 630 shown in FIG. 6D.

Meanwhile, in order to display information (e.g., number, system resource utilization, etc.) on the currently executed application, it is possible to either individually employ or adopt various combinations of the display methods of the first exemplary embodiment and the second exemplary embodiment of the present invention as described above.

Third Exemplary Embodiment

The third exemplary embodiment of the present invention corresponds to a process of displaying a list of one or more applications being executed and the system resources utilized by each of the applications, and then terminating a preset one or more applications being executed in response to a user's request.

Figure 7:
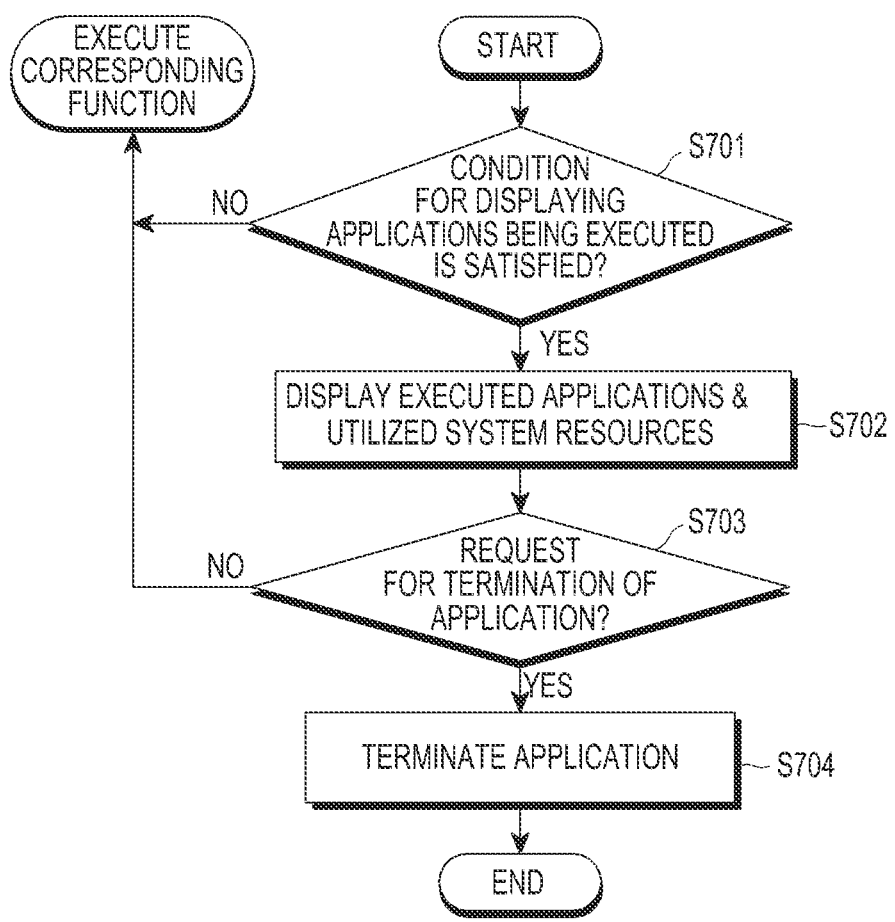
FIG. 7 is a flowchart illustrating a process according to a third exemplary embodiment of the present invention.

FIG. 7 is a flowchart illustrating a process according to a third exemplary embodiment of the present invention, FIGS. 8A to 8D illustrate first examples of screens according to the third exemplary embodiment of the present invention, FIGS. 9A to 9C illustrate second examples of screens according to the third exemplary embodiment of the present invention, and FIG. 10 illustrates a third example of a screen according to the third exemplary embodiment of the present invention.

Figure 8A:
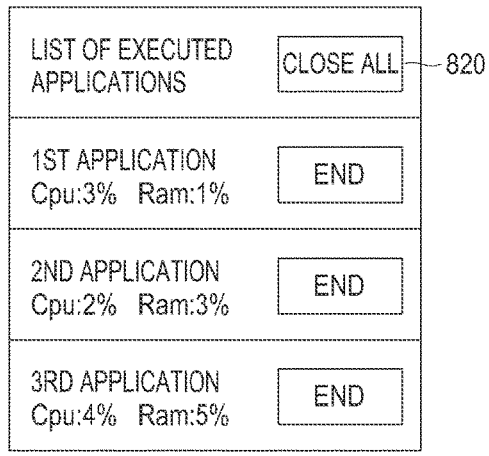
FIGS. 8A to 8D illustrate first examples of screens according to the third exemplary embodiment of the present invention.

In steps S701 to S702, the controller 10 determines if a condition for displaying one or more applications being executed is satisfied. When the condition is satisfied, the controller 10 controls to display the system resources utilized by the one or more applications being executed as shown in FIG. 8A.

The satisfaction of the condition for displaying one or more applications being executed in step S701 may have various meanings according to exemplary embodiments of the present invention, which include at least five basic meanings as follows.

First, the satisfaction of the condition for displaying one or more applications being executed may signify a state in which the user has identified the number of applications being executed in the background and selected a number widget, or application, which notifies the number.

For example, the user may select one of the numbers, widgets, and applications, each of which indicates the number of applications being executed, as indicated by reference numerals 310, 320, 330, 410, 420, and 430 of FIGS. 3A to 4D, and the controller 10 may determine this selection as a satisfaction of the condition for the displaying and thus control to display a list of one or more applications being executed in the background together with system resources utilized by the one or more applications.

In other words, by selecting (e.g., touching) one of the numbers, widgets, and applications, each of which indicates the number of applications being executed in the background, as shown in FIGS. 3A to 4D, the user can request that the one or more applications being executed in the background and system resources utilized by the one or more applications should be displayed either on the entire screen as shown in FIG. 8A or on a smaller-sized screen rather than the entire screen.

Second, the satisfaction of the condition for the displaying may signify a state in which the user has been notified of the sum of the system resources utilized by one or more applications being executed in the background through an indicator bar and has made a preset input through the indicator bar.

For example, the user may select one of the indicator bars indicated by reference numerals 610, 620, and 630 of FIGS. 6A to 6D according to the second exemplary embodiment of the present invention described above and thus request that a list of one or more applications being executed in the background and system resources utilized by the one or more applications should be displayed.

That is, the user first identifies the status of the system resources utilized by the one or more applications being executed in the background through the change (e.g., visual change) of the indicator bar. Then, when the user determines that too many system resources are being utilized by the one or more applications being executed in the background, the user may select the indicator bar notifying of this information (for example, the user may touch the indicator bar 630 displayed in red color). Then, the controller 10 determines that the touch input of the indicator bar has satisfied the condition for the displaying, and may control to display the one or more applications being executed in the background and the system resources utilized by the one or more applications as shown in FIG. 8A.

According to a modified exemplary embodiment of the present invention, when movement of the indicator bar is allowed, the user can move the indicator bar by dragging the indicator bar, so as to request that a list of applications being executed in the background and system resources utilized by the applications should be displayed. For example, an indicator bar located at the top of the display screen can be moved to a lower position in the screen through a dragging input (for example, the indicator bar can be touched and then dragged down to the lower end). Therefore, the user can change the location of the indicator bar through the dragging, and the controller 10 may determine such a location change as a satisfaction of the condition for the displaying and then control to display a list of one or more applications being executed in the background and system resources utilized by the applications.

Third, the satisfaction of the condition for the displaying may signify a state in which an execution time (background execution time) of the one or more applications being executed in the background exceeds a preset reference time.

When a plurality of applications are executed and are then switched into a background execution state or a foreground execution state, it is not always possible for a user to notice the existence of one or more applications being executed in the background or to identify how long the one or more applications have been in the background execution state. The fact that one or more applications are being executed in the background for a long time signifies that it is highly probable that the user would not use the one or more applications for the time being, which implies that the battery power of the portable terminal is being unnecessarily consumed.

Therefore, when there are one or more applications being executed in the background as in the example when each application is switched from the foreground execution state to the background execution state, the controller 10 according to an exemplary embodiment of the present invention determines how long each application has been executed in the background state. Thereafter, if it is determined that the time during which any application has been executed in the background exceeds a preset time (for example, 10 minutes, which can be selectively set by the user), the controller 10 may determine that the condition for the displaying has been satisfied and may control to display a list of the one or more applications being executed in the background and the system resources utilized by the one or more applications.

If the condition for the displaying is satisfied when the time during which any application has been executed in the background exceeds a preset time, it is possible to make a configuration for displaying only those applications, which have been executed in the background for more than the preset time, together with the system resources utilized by those applications.

Fourth, the satisfaction of the condition for the displaying may signify a state in which it is identified that the remaining battery power of the portable terminal is lower than a preset threshold.

The controller 10 according to an exemplary embodiment of the present invention checks the remaining battery power at a preset time interval. When the controller 10 has identified that the remaining battery power is lower than a preset threshold (for example, 50%, which can be selectively set by the user), the controller 10 determines that the condition of the displaying has been satisfied, and then controls to display the one or more applications being executed and system resources utilized by the applications as shown in FIG. 8A. That is, when it is determined that the remaining battery power of the portable terminal has reached a value lower than a preset threshold, the controller 10 can control to automatically display a list of one or more applications being executed in the background and system resources utilized by the one or more applications.

Fifth, the satisfaction of the condition for the displaying may signify a state in which the number of executed applications exceeds a preset number.

When 20 applications are being executed by a request from a user, only one of the 20 applications is executed in the foreground while the other 19 applications are executed in the background. Then, the excessively large number of applications executed in the background may cause unnecessary consumption of the battery power of the portable terminal.

Therefore, when it is identified that the number of applications executed in the background is larger than or equal to a preset number (for example, seven, which can be selectively set by the user), the controller 10 according to an exemplary embodiment of the present invention may determine that the condition of the displaying has been satisfied, and then control to display the one or more applications being executed in the background and the system resources utilized by the one or more applications. At this time, the number of applications relating to the satisfaction of the condition for the displaying may include either only the number of applications executed in the background or both the number of applications executed in the background and the number of applications executed in the foreground.

Like the condition for the displaying in step S701, the method of displaying one or more executed applications and system resources utilized by the one or more executed applications (hereinafter, referred to as simply "displaying method") in step S702 also includes various modifications according to exemplary embodiments of the present invention as described below.

First, the displaying method of step S702 can be implemented by an exemplary embodiment in which only one or more applications being executed in the background while utilizing the system resources by a proportion exceeding a preset value (or preset threshold) are displayed. More specifically, in displaying the one or more applications being executed in the background (e.g., the one or more applications which are not currently used by the user) and the system resources utilized by the one or more applications, only applications utilizing more than a preset proportion of the system resources (e.g., applications utilizing more than 5% of the CPU and memory) may be displayed in a discriminated manner. In other words, instead of displaying all applications being executed in the background, only applications utilizing more than a preset proportion of the system resources and thus having a relatively large influence on the power consumption of the battery may be separately displayed.

Figure 8B:
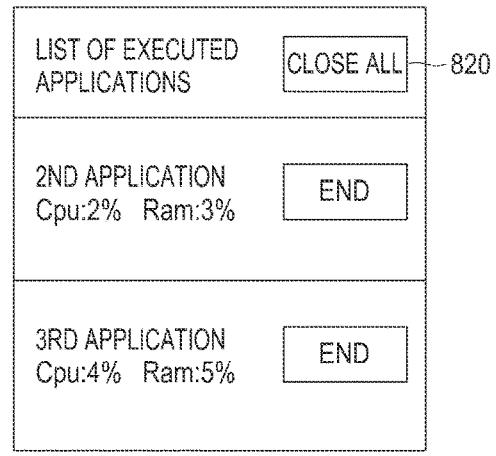

Therefore, when it is determined in step S701 that the condition for the displaying has been satisfied, the controller 10 according to an exemplary embodiment of the present invention controls to display only the one or more applications being executed in the background while utilizing the system resources by a proportion exceeding a preset value (e.g., 5%), like the second application and the third application shown in FIG. 8B.

Second, the displaying method of step S702 can be implemented by an exemplary embodiment in which the utilization proportions of the system resources utilized by the one or more applications being executed in the background are identified and the one or more applications are displayed while being arranged in an ascending order or descending order of the utilization proportions of the system resources. More specifically, all applications being executed in the background may be displayed while they are arranged based on the utilization proportions of the system resources (in an ascending order or descending order of the utilization proportions).

Figure 8C:
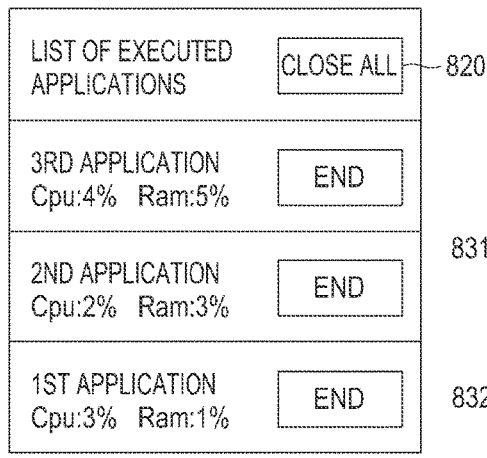

Therefore, when it is determined in step S701 that the condition for the displaying has been satisfied, the controller 10 according to an exemplary embodiment of the present invention controls to display the applications being executed in the background together with the utilization proportions of the system resources in an ascending order of the utilization proportions, as shown in FIG. 8C.

Third, the displaying method of step S702 can be implemented by an exemplary embodiment in which only applications using devices consuming large standby power while being executed in the background are displayed.

Not only the one or more applications being executed in the background utilize the system resources and consume power (i.e., battery power) of the portable terminal, but any device operating in relation to any executed application also consumes power of the portable terminal. This implies that, even when one or more applications being executed in the background do not utilize a high proportion of the system resources, if one or more devices operating in relation to the executed one or more applications consume large standby power, the one or more applications being executed in the background while using the one or more devices consume more power than the other applications which do not use the device or devices.

Figure 8D:
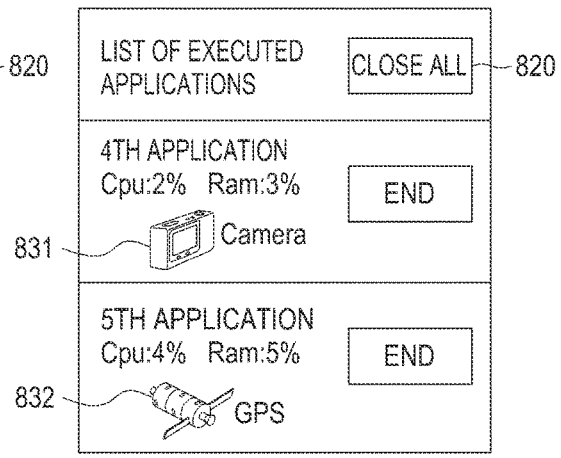

Therefore, when it is determined in step S701 that the condition for the displaying has been satisfied, the controller 10 according to an exemplary embodiment of the present invention controls to display only the one or more applications using devices consuming relatively large standby power, which include the fourth application using the camera device and the fifth application using the GPS device as shown in FIG. 8D, in a discriminated manner.

By combining the five exemplary embodiments relating to the condition of the displaying in step S701 and the three exemplary embodiments relating to the displaying method in step S702, it is possible to yield various additional exemplary embodiments of the present invention, through which exemplary embodiments of the present invention can allow a selective displaying of only applications corresponding to a preset condition among the one or more applications being executed in the background.

As one example of the yieldable exemplary embodiments, when there are one or more applications, which use one or more devices consuming a relatively large amount of standby power and have been executed in the background for more than 10 minutes, a list of the one or more applications is automatically (or manually by the user) displayed, so that the user can terminate one of the one or more applications.

As another example of the yieldable exemplary embodiments, when more than a preset number of applications (e.g., more than ten applications) are being executed (in the background or the foreground or in both of them), only applications utilizing a preset proportion (e.g., 3%) of the system resources are automatically (or manually by the user) displayed among the ten applications, so that the user can selectively (or collectively) terminate one or more of the applications, which are being executed in the background and utilize a high proportion of the system resources, thereby consuming large battery power and degrading the system performance.

In steps S703 to S704, after steps S701 to S702, when there is a request for termination of at least one of the displayed applications, the controller 10 controls to terminate the one or more applications requested to be terminated.

When a list of one or more executed applications is displayed as shown in one of FIGS. 8A to 8D, the user can selectively terminate at least one application utilizing a large proportion of the system resources and consuming too much battery power or collectively terminate all the displayed applications.

For example, the user can select (e.g., touch) the END button 810 of FIG. 8A, so as to request the termination of the third application, which utilizes 4% of the CPU and 5% of the RAM. In response to the request, the controller 10 controls to terminate the third application and update the status information on the applications being executed and the utilized resources as shown in FIG. 9A.

Further, when the user touches and selects the "CLOSE ALL" button 820, the controller 10 collectively terminates the one or more applications being executed (including the first application, the second application, and the third application) and notifies the user of information on the collective termination as shown in FIG. 9B. Here, the terminated one or more applications may correspond to all applications being executed in the background or all displayed applications.

According to a modification of the third exemplary embodiment of the present invention as shown in FIGS. 9C and 10, when the user has the requested termination of a preset application, the portable terminal may display additional information about the application requested to be terminated, based on the list of one or more applications being executed and the utilized system resources.

When there are many applications being executed and the user wants to terminate one application, which the user does not have any experience of using, among the applications being executed, the user may not be exactly aware of the function which the application provides and the function which the application is performing. Therefore, exemplary embodiments of the present invention enable the user to additionally acquire information on the application, which the user wants to terminate, such as advice for the application (e.g., advice relating to main functions and use functions) and an explanation on the operation being executed.

For example, when the user has requested to terminate the second application, the controller 10 may control to display information notifying that the second application is transmitting or receiving data as shown in FIG. 9C, so as to ask the user for confirmation of the intention to terminate the second application, or may display information on how to use the portable terminal or information (e.g., instructions or advice) relating to the second application as shown in FIG. 10, so as to ask the user for confirmation of the intention to terminate the second application.

According to exemplary embodiments of the present invention, it is possible to prevent the battery power consumption and the degradation of the system performance due to the system resources utilized by one or more applications being executed, while providing a multi-tasking function through a plurality of applications.

Also, according to exemplary embodiments of the present invention, when a plurality of applications are executed, such execution of the applications is reported to the user, so as to enable the user to terminate one or more applications, thereby preventing unnecessary consumption of battery power.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method of managing one or more applications being executed in a portable terminal, the method comprising:
    displaying, as at least part of a user selectable user interface item, a graphical indication of an amount of collective resources used by one or more executing applications, the user interface item being displayed on a portion of a display of the portable terminal;
    receiving a first user selection of the user interface item displayed on the portion of the display through an input device of the portable terminal;
    in response to the first user selection, displaying a list of the one or more executing applications including a respective amount of resources used by each of the one or more executing applications on the display and displaying one or more buttons corresponding to each of the one or more executing applications on the display;

receiving a second user selection of one of the one or more buttons to stop the execution of at least one of the one or more executing applications through the input device;

in response to the second user selection, stopping the execution of the at least one of the one or more executing applications; and after the stopping of the execution of the at least one of the one or more executing applications, updating the amount of collective resources, wherein the resources used by the one or more executing applications include at least one of Central Processing Unit (CPU) and memory resources.

2. The method of claim 1, wherein the displaying of the list of the one or more executing applications comprises displaying the list of the one or more executing applications in one of an ascending and a descending order according to the respective amount of resources used by the each of the one or more executing applications.

3. The method of claim 1, wherein the displaying of the list of the one or more executing applications comprises displaying a number of the one or more executing applications.

4. The method of claim 1, wherein the displaying of the list of the one or more executing applications comprises displaying a button to stop the execution of all of the one or more executing applications.

5. The method of claim 1, wherein the displaying of the list of the one or more executing applications comprises displaying one or more icons corresponding to each of the one or more executing applications.

6. The method of claim 1, wherein the user interface item is movable.

7. The method of claim 1, wherein at least one of the first user input and the second user input is a touch input.

8. The method of claim 1, wherein the user interface item corresponds to one of a program monitor widget and a program monitor application.

9. The method of claim 1, wherein the user interface item is displayed on a home screen.

10. A portable terminal for managing one or more applications being executed, the portable terminal comprising:
an input device;
a display; and
at least one processor configured to:
control to display, as at least part of a user selectable user interface item, a graphical indication of an amount of collective resources used by one or more executing applications, the user interface item being displayed on a portion of the display,
control to receive a first user selection of the user interface item displayed on the portion of the display through the input device,
control to, in response to the first user selection, display a list of the one or more executing applications including a respective amount of resources used by each of the one or more executing applications on the display and display one or more buttons corresponding to each of the one or more executing applications on the display,
control to receive a second user selection of one of the one or more buttons to stop the execution of at least one of the one or more executing applications through the input device,
stop the execution of the at least one of the one or more executing applications in response to the second user selection, and
update, after the stopping of the execution of the at least one of the one or more executing applications, the first amount of collective resources,
wherein the resources used by the one or more executing applications include at least one of Central Processing Unit (CPU) and memory resources.

11. The portable terminal of claim 10, wherein the at least one processor is further configured to control to display the list of the one or more executing applications in one of an ascending and a descending order according to the respective resources used by the each of the one or more executing applications.

12. The portable terminal of claim 10, wherein the at least one processor is further configured to control to display, when controlling to display the list of the one or more executing applications, a number of the one or more executing applications.

13. The portable terminal of claim 10, wherein the at least one processor is further configured to control to display, when displaying the list of the one or more executing applications, a button to stop the execution of all of the one or more executing applications.

14. The portable terminal of claim 10, wherein the at least one processor is further configured to control to display, when displaying the list of the one or more executing applications, one or more icons corresponding to each of the one or more executing applications.

15. The portable terminal of claim 10, wherein the user interface item is movable.

16. The portable terminal of claim 10, wherein the input device and the display collectively form a touchscreen, and wherein at least one of the first user input and the second user input is a touch input on the touchscreen.

17. The portable terminal of claim 10, wherein the user interface item corresponds to one of a program monitor widget and a program monitor application.

18. The portable terminal of claim 10, wherein the user interface item is displayed on a home screen.

19. A non-transitory computer-readable recording medium encoded with one or more instructions, which when executed by at least one processor of a portable terminal, causes at least one processor to:
control to display, as at least part of a user selectable user interface item, a graphical indication of an amount of collective resources used by one or more executing applications, the user interface item being displayed on a portion of a display of the portable terminal;
control to receive a first user selection of the user interface item displayed on the portion of the display through an input device of the portable terminal;
control to, in response to the first user selection, display a list of the one or more executing applications including a respective amount of resources used by each of the one or more executing applications on the display and display one or more buttons corresponding to each of the one or more executing applications on the display;
control to receive a second user selection of one of the one or more buttons to stop the execution of at least one of the one or more executing applications through the input device;
stop the execution of the at least one of the one or more executing applications in response to the second user selection; and
update, after the stopping of the execution of the at least one of the one or more executing applications, the amount of collective resources, wherein the resources used by the one or more executing applications include at least one of Central Processing Unit (CPU) and memory resources.

* * * * *